United States Patent

[11] 3,555,354

[72] Inventor Peter Kotos
 Havertown, Pa.
[21] Appl. No. 806,191
[22] Filed Mar. 11, 1969
[45] Patented Jan. 12, 1971
[73] Assignee General Electric Company
 a corporation of New York

[54] ALTERNATING CURRENT CIRCUIT BREAKER HAVING A CONTROL FOR TIMING OPENING RELATIVE TO THE CURRENT WAVE
19 Claims, 7 Drawing Figs.

[52] U.S. Cl. .................................................. 317/11,
 307/133, 307/136, 317/36
[51] Int. Cl. ......................................................... H02h 3/08
[50] Field of Search .......................................... 317/11.1,
 36TD; 307/232, 133, 136

[56] References Cited
UNITED STATES PATENTS
2,372,139  3/1945  VanSickle .................... 317/11

3,206,642  9/1965  Farris .......................... 317/11
3,243,656  3/1966  Baude .......................... 317/11
3,265,933  8/1966  Perry et al. .................. 317/11

Primary Examiner—J.D. Miller
Assistant Examiner—Harry E. Moose, Jr.
Attorneys—J. Wesley Haubner, William Freedman, Frank L. Neuhauser, Oscar B. Waddell and Melvin M. Goldenberg ABSTRACT: Discloses a fault current responsive opening control for an AC circuit breaker which is capable of fully separating its contacts within an operating time of less than 4 milliseconds following reception of a tripping signal from the control. The control comprises means for measuring during each full loop of fault current the time period from zero crossing to peak current. Means responsive to the length of this time period delivers a tripping signal to the circuit breaker at a point between peak current and the immediately following current zero if the measured time period exceeds a preselected value at least as great as said operating time.

INVENTOR:
PETER KOTOS,
BY William Freedman
ATTORNEY 3,555,354

ALTERNATING CURRENT CIRCUIT BREAKER HAVING A CONTROL FOR TIMING OPENING RELATIVE TO THE CURRENT WAVE

This invention relates to an electric circuit breaker for an alternating current circuit and, more particularly, relates to an opening control for such a circuit breaker which is capable of timing the opening operation of a circuit breaker with respect to the current wave in such a manner as to reduce the arcing energy released during interruption.

Certain types of circuit breakers, e.g., vacuum circuit breakers, can interrupt fault current on the first current zero following contact part, assuming the contacts have been separated a short distance at this instant. The amount of contact separation needed to consistently interrupt fault currents is referred to hereinafter as the "effective interrupting distance." In order to consistently achieve contact separation by an effective interrupting distance at the instant of the first current zero, it is necessary that the contacts be consistently parted well ahead of current zero and that contact separation take place at very high speed.

If an effective interrupting distance can be achieved within a few milliseconds following delivery of a tripping signal to the circuit breaker, then it is possible to delay delivery of the tripping signal until around the instant of peak current or even later and still interrupt at the first current zero. By so delaying the tripping signal, it is possible to reduce the total arcing time and to avoid arcing at peak current, thus reducing the arcing energy released when interrupting currents of a given magnitude. This results in reduced contact-erosion and increased current-interrupting capability. In the circuit breaker of the present invention, I rely upon high-speed contact separation and delayed delivery of the tripping signal until peak current or later in order to realize the above-described advantages.

A problem that is encountered when the tripping signal is delayed until peak current or later is that under certain asymmetrical current conditions, insufficient time might be available to achieve the necessary contact separation by the first current zero. More specifically, if the tripping signal is delivered during a minor current loop, then only a relatively short time might be available between the instant of peak current and the next following current zero. The length of this time will vary inversely with the degree of offset of the current wave. If the current wave is appreciably offset, then insufficient time will be available during the minor current loop to achieve the necessary contact separation by the time of current zero. This means that arcing will continue through the next loop of current, which will be a major loop, and the contacts will therefore be exposed to peak current and the high arcing energy accompanying a full major loop of asymmetrical current.

An object of my invention is to assure that interruption takes place at the first current zero following delivery of the tripping signal, even though the tripping signal is delivered at or even after the instant of peak current and even though the current being interrupted is highly asymmetrical.

Another object is to provide for a circuit breaker a tripping control which can consistently and accurately supply a tripping signal to the circuit breaker at a desired point on the current wave, even under conditions of high fault current.

Prior tripping controls that have been proposed for comparable circuit applications have typically relied upon conventional current transformers to provide an input signal to the control. Correct operation of the control has depended upon this input signal having a waveform that is an accurate representation of the waveform of the current in the power line. Under low fault current conditions, the current transformer can provide a reasonably accurate representation of the line current waveform; but under high fault current conditions, the current transformer saturates, and this can severely distort the waveform of the input signal.

Another object of the invention is to provide a tripping control, accurate at high fault currents, which does not depend for its accuracy upon a current transformer providing an output current reproducing the waveform of the line current.

In carrying out the invention in one form, I provide an alternating current circuit breaker which is capable of separating its contacts by an effective interrupting distance within a predetermined operating time of less than 4 milliseconds after a tripping signal is supplied thereto. For supplying a tripping signal thereto, I provide a control which comprises means for measuring the time period during each full loop of fault current between the instant that the fault current crosses zero and the instant fault current reaches its peak value following said zero crossing. Additional means responsive to the length of said measured time period is provided for delivering a tripping signal to the circuit breaker at a point between substantially the instant of peak current and the immediately following current zero if said time period exceeds a preselected value at least as great as said predetermined operating time for the circuit breaker. Blocking means is provided for preventing said control from delivering said tripping signal to said circuit breaker prior to said immediately following current zero if said time period is less than said preselected value.

For a better understanding of the invention, reference may be had to the following description taken in conjunction with the accompanying drawings, wherein.

GENERAL DESCRIPTION OF CIRCUIT BREAKER

Figure 1:
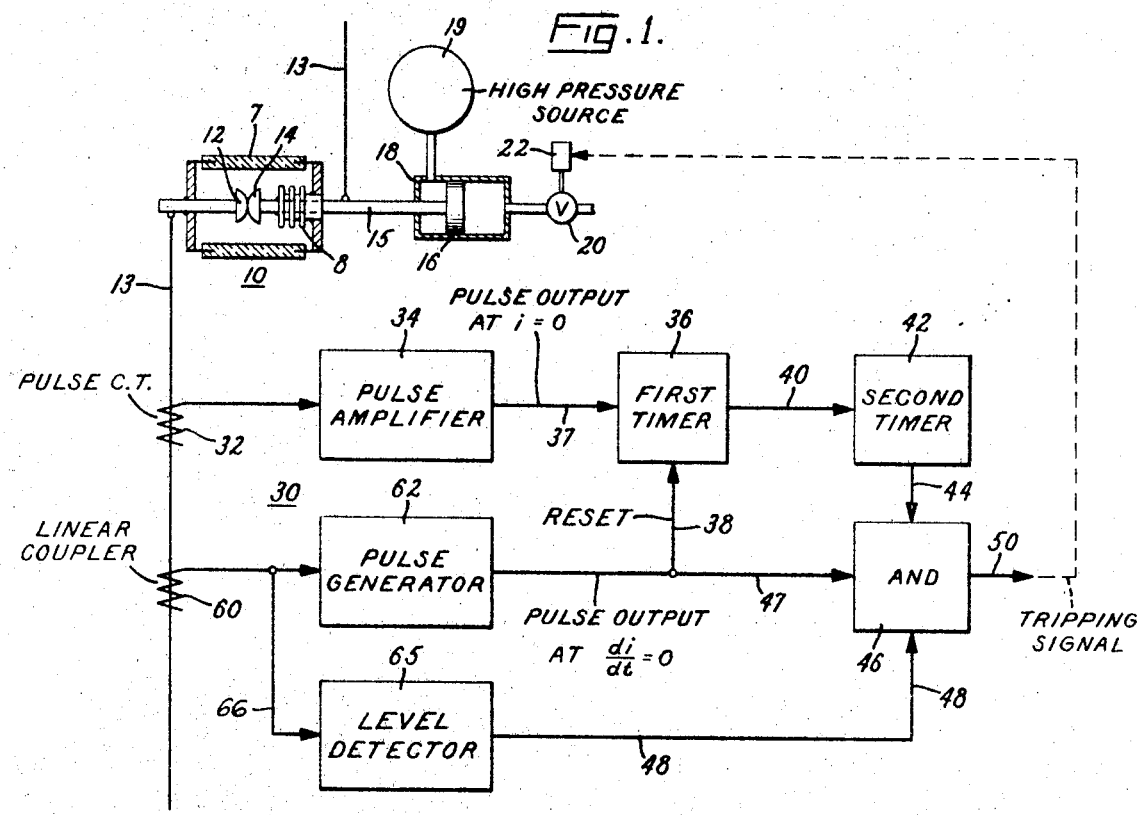
FIG. 1 is a schematic illustration of a circuit breaker and tripping control embodying one form of the invention.

Referring now to FIG. 1, there is shown a circuit breaker 10 which comprises a pair of separable contacts 12 and 14 connected in a powerline 13. The illustrated circuit breaker is of the vacuum type and, as such, comprises a highly evacuated insulating housing 7 in which the contacts 12 and 14 are located. The contacts are shown in FIG. 1 in their closed position. Contact 12 is a stationary contact, and contact 14 is a movable contact attached to a conductive operating rod 15 projecting through one end of housing 7. A suitable flexible bellows 8 provides a seal about rod 15 and permits reciprocal movement thereof without impairing the vacuum inside housing 7. A vacuum-type interrupter of this nature is shown and claimed in U.S. Pat. No. 3,246,979, Lafferty et al., assigned to the assignee of the present invention, and reference may be had thereto if a more detailed description is desired.

For opening and closing the circuit breaker, I provide an extra high-speed operator comprising a piston 16 attached to operating rod 15 and slidably mounted in a cylinder 18. High pressure fluid from a source 19 acts on the left-hand side of the piston in a direction to drive the movable contact open, but piston movement is normally prevented by the same high pressure acting on the right-hand side of the piston. A normally closed valve 20 can be opened to vent the pressurized fluid on the right-hand side of the piston, thus allowing the pressurized fluid at the left-hand side of the piston to rapidly drive the piston 16 toward the right. This movement of piston 16 to the right rapidly separates the movable contact 14 from stationary contact 12, thus opening the circuit breaker.

The valve 20 is controlled by a solenoid 22, which, in turn, is controlled by a tripping control 30 that is responsive to current in powerline 13. When the tripping control 30 delivers a tripping signal to the solenoid 22, the solenoid responds by opening valve 20 as above described to initiate circuit breaker opening. Valve 20 is a conventional high-speed valve comprising a main valve assembly and a sensitive pilot valve assembly, the pilot valve assembly being operable by the solenoid to initiate opening of the main valve assembly. Since valves of this type are conventional, valve 20 has been shown in schematic form only.

A vacuum-type circuit breaker, such as depicted, can interrupt fault currents after its contacts have been separated only a very short distance. For example, in a typical high voltage vacuum circuit breaker, the full current interrupting capacity is typically attained after a contact separation of only one-half to three-fourths inches, and this is typical full contact separation. When operated by an extra high-speed mechanism such as that schematically depicted in FIG. 1, the vacuum circuit breaker can fully separate its contacts and develop very high current interrupting capabilities in less than 4 milliseconds after a tripping signal has been received by the breaker.

I effectively utilize this exceptional ability to rapidly attain full contact separation by delaying contact part until after peak current has been reached. Because the circuit breaker can attain substantially its full contact separation within a few milliseconds following contact part, there usually is still sufficient time available to attain full contact separation by the time of the first current zero; and, accordingly, the circuit breaker is able to interrupt at the first current zero, despite having started to separate its contact after peak current. But there is one type of situation where sufficient time might not be available prior to current zero, and this is the situation where the current being interrupted is appreciably offset, or asymmetrical. During a minor loop of such current, only a few milliseconds or even less is available between peak current and the next following current zero, and this may not be enough to allow for interruption. My tripping control 30 solves this problem by examining a portion of each current loop to determine the probable duration of the loop and by developing a tripping signal only when the duration will exceed a predetermined minimum value long enough to provide reasonable assurance of successful interruption. The manner in which this is accomplished will be apparent from the following description of the tripping control 30.

DESCRIPTION OF TRIPPING CONTROL 30

The tripping control 30 comprises a conventional pulse current transformer 32 which produces a short duration voltage pulse at the instant the current in line 13 passes through zero. The amplitude of this voltage pulse varies directly with the rate of change in the line current as it passes through zero. This voltage pulse is supplied to and is amplified by a conventional pulse amplifier 34; and the pulse output from amplifier 34 is supplied to a first timer 36 via an input circuit or channel 37.

The timer 36 is a normally off device, which is turned on by a voltage pulse of a predetermined minimum amplitude being supplied thereto via channel 37. Pulse amplifier 34 supplies a pulse to timer 36 at current zero each time the current in line 13 passes through zero, but these pulses are of insufficient amplitude to turn on the timer until the line 13 develops a fault that will produce currents of several times rated current. When such a fault develops, amplifier 34 will supply a voltage pulse of an amplitude sufficient to turn on timer 36 each time the line current passes through zero.

Timer 36 has two input channels 37 and 38. The timer 36 will respond to a turn-on voltage pulse received from amplifier 34 via input channel 37 by producing a prolonged output signal lasting 4.17 milliseconds (or one-fourth cycle on a 60 hertz basis) unless during this latter interval a pulse signal is received via input channel 38. If a pulse signal is received via input channel 38 during this latter interval, the timer will immediately reset and its output signal will be immediately terminated. The output signal for timer 36 appears on channel 40, which is an input circuit to a second timer 42.

The second timer 42 is a normally off device which can be turned on by an output signal from the first timer 36 only if the output signal lasts for at least 3.9 milliseconds (slightly less than one-fourth cycle). When the second timer 42 turns on, it produces a continuous output lasting 4.6 milliseconds (slightly longer than one-fourth cycle). This output is supplied through a channel 44 to a "3-AND" circuit 46, soon to be described. The second timer 42 immediately resets to its normal-at-rest condition should the input from the first timer 36 be terminated before the second timer turns on.

The timers 36 and 42 have been shown in schematic form only since their details form no part of the present invention. Reference may be had to U.S. Pat. No. 3,317,745-Scharf, assigned to the assignee of the present invention, for examples of timing circuits suitable for these applications. The circuit of Scharf's FIG. 3 can be used for timer 42; and the circuit of Scharf's FIG. 1, with minor modification, can be used for timer 36. The minor modification is to add to Scharf's circuit of FIG. 1 suitable reset means for terminating its output in response to a reset signal corresponding to the reset signal appearing at 38 in my FIG. 1. This is accomplished by providing in parallel with Scharf's resistor 22 a normally off transistor (not shown) which is turned on by the reset signal, and upon turn-on, connects Scharf's capacitor 23 in a low impedance charging circuit across the terminals S and R, to cause it to be quickly recharged.

The 3-AND circuit 46 is a conventional AND logic circuit that requires the simultaneous presence of three input signals to produce an output signal. One of these input signals can be supplied thereto through channel 44, as above-described. The other two input signals are supplied thereto through channels 47 and 48, respectively, as will soon be described. The output signal resulting from the simultaneous presence of input signals on channels 44, 47 and 48 appears at 50 and is used for energizing the solenoid 22 to trip open the circuit breaker. This output signal is referred to hereinafter as the tripping signal, and the manner in which it is produced will soon be discussed in greater detail.

For obtaining additional information on the current in powerline 13, I provide a nonsaturable coupler 60, commonly referred to as a "linear coupler." This linear coupler comprises a core (not shown) of nonmagnetizable material surrounding the primary conductor 13 and a large number of secondary turns linked to this core. The output from the linear coupler is a voltage proportional to the rate of change of current in line 13, i.e., $di/dt$. Such linear couplers are well-known and reference may be had to U.S. Pat. No. 2,241,127-Harder if more details are desired.

The output voltage from linear coupler 60 is applied to a conventional pulse generator 62 which produces a short duration voltage pulse at the instant 81 that $di/dt$ in power line 13 equals zero. Such a voltage pulse is produced each time $di/dt$ equals zero. Thus, each time the current in the powerline 13 reaches its peak value, a pulse is produced by pulse generator 62. This pulse is supplied to timer 36 via reset channel 38 and to AND circuit 46 via input channel 47.

The output voltage from linear coupler 60 is also supplied to a conventional level detector 65 via an input channel 66. Whenever $di/dt$ exceeds a predetermined valve, this level detector will produce a continuous output that appears at 48. In one specific embodiment of the invention, this level detector 65 is set so that no output appears at 48 until the line 13 develops a fault-producing currents in excess of about 10 times rated current. Such faults will cause the current in the line 13 to change at such a rate that the level detector immediately produces an output at 48. This output at 48 continues until the line current is reduced to below pickup setting of level detector.

OVERALL OPERATION OF TRIPPING CONTROL 30

The overall operation of control 30 will now be explained with reference to FIG. 2, which graphically portrays certain system relationships that are present when a fault-producing symmetrical current is present on line 13. This current in the line is designated $i$ and the rate of change of this current is designated $di/dt$. The abscissa of the graph represents time $t$. Assume that the fault occurs just prior to $t = 0$, $i = 0$ and the output from the pulse amplifier 34 is a pulse depicted at 70. Also when $t = 0$, $di/dt$ is a maximum and the level detector 65 begins producing a continuous output depicted at 72, which is fed to the AND circuit 46 via channel 48.

The pulse from amplifier 34 immediately starts the first timer 36 and causes it to produce an output signal 74 lasting 4.17 milliseconds. The output from the first timer 36 is fed into the second timer 42; and after 3.7 milliseconds, the second timer produces a continuous output 75 lasting 4.6 milliseconds, which is fed into the AND circuit 46.

At instant 81 when $t = 4.17$ milliseconds (or one-fourth cycle), $di/dt$ passes through zero, and the pulse generator 62 produces a pulse 76. This pulse 76 is fed to the AND circuit 46 via channel 47. Arrival of the pulse 76 at the AND circuit 46 results in the simultaneous presence on its input channels of three input signals (75, 72 and 76). This causes the AND circuit 46 to immediately produce an output signal 78, which is supplied via channel 50 to the trip coil 22, thereby tripping the circuit breaker 10.

It will thus be apparent that tripping signal 78 was supplied to the circuit breaker 10 at substantially the instant of peak current. This allows the circuit breaker substantially one-fourth cycle (or 4.17 milliseconds) to separate its contacts by an "effective interrupting distance" by the time the next-following current zero is reached at 80. Since the circuit breaker is capable of fully separating its contacts in less than 4 milliseconds, its contacts are fully open by the time of current zero 80, and the current is easily interrupted.

Figure 2:
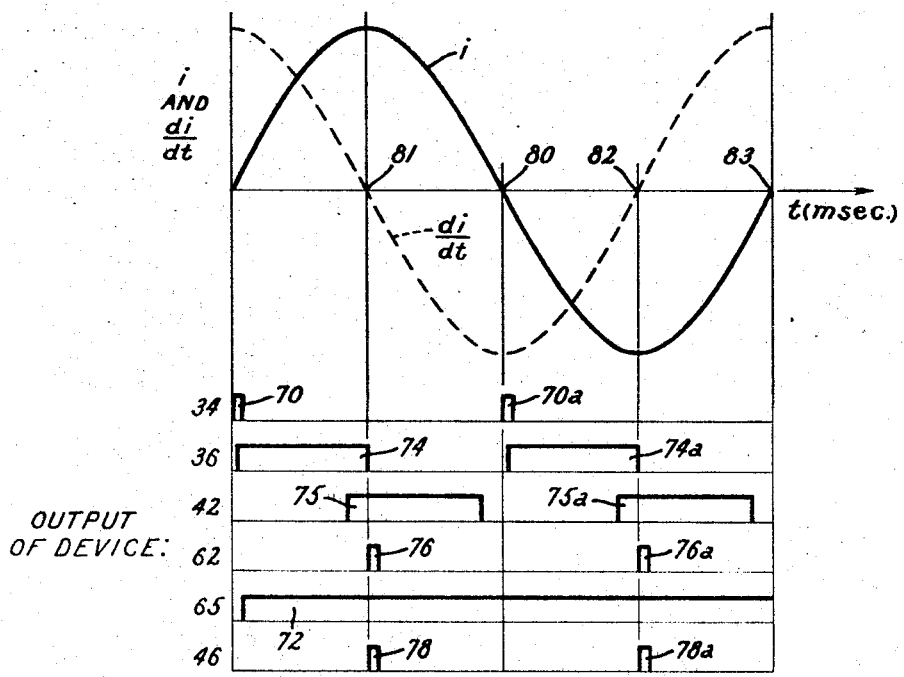
FIG. 2 is a graphic representation of certain relationships present in the system of FIG. 1 during a fault-producing symmetrical current.

If for some reason, soon to be explained, the circuit breaker is not prepared to trip at instant 81, the same events will be repeated on the next half cycle, as depicted in FIG. 2 by the pulses having the suffixes "a." If the circuit breaker is prepared to trip at 82, the tripping signal 78a will cause tripping, and the circuit will be interrupted by the breaker at 83.

Figure 3:
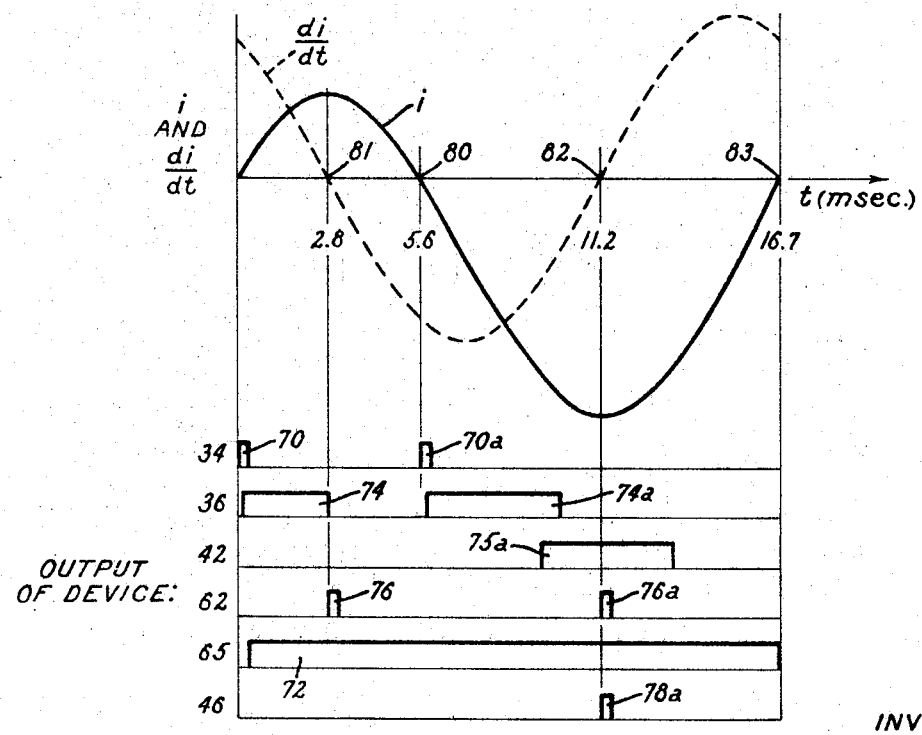
FIG. 3 is a graphic representation of certain relationships that are present in the system of FIG. 1 during a fault-producing asymmetrical current.

Consider next a fault producing an asymmetrical fault current $i$ depicted in the graph of FIG. 3. It will be assumed that the first current loop following fault inception is a minor current loop having a duration of about 5.6 milliseconds. At $t = 0$, the pulse amplifier 34 produces a pulse 70 which turns on first timer 36. Timer 36 produces a continuous output 74. The second timer 42 will turn on in response to this continuous output 74 if it persists for 3.9 milliseconds; but in this particular case, the output 74 is terminated before this time by a reset pulse 76 supplied from pulse generator 62 via channel 38. This pulse 76 is developed by pulse generator 62 when $di/dt = 0$, i.e., when the current $i$ reaches its peak at instant 81. Since this is a minor current loop of 5.6 milliseconds duration, peak current will be reached at about 2.8 milliseconds. Thus the pulse 76 will be developed prior to 3.9 milliseconds and will terminate the output 74 from the first timer 36 before it can turn on the second timer 42. Since the second timer remains turned off, pulse 76 from pulse generator 62, does not turn on the AND circuit 46. Thus on this minor current loop, no output signal is developed by the AND circuit and no tripping of circuit breaker 10 occurs prior to the current zero point. As explained previously, the second timer 42 immediately resets to its normal-at-rest condition when its input is terminated prior to its turn-on.

The level detector 65 turned on shortly after the above-described minor loop of current began, thus producing at output signal 72 which was fed to the AND circuit 46 via channel 48. This output signal 72 continues past the current zero point and so long as fault current flows in line 13.

The next current loop following the above-described minor loop will be a major loop of about 11.1 milliseconds duration. When the current $i$ passes through zero at the start of this loop, the pulse amplifier 34 produces a pulse 70a, thus turning on timer 36 and causing it to produce a continuous output 74a, which is fed into the previously reset second timer 42. This output 74a continues for a long enough period to turn on the second timer 42, thus causing timer 42 to supply a continuous output signal 75a lasting 4.6 milliseconds to the AND circuit 46. When the line current $i$ in the major loop reaches its peak value at instant 82, about 5.6 milliseconds will have elapsed since the immediately preceding current zero 80. Thus, the pulse 76a developed by the pulse generator 62 at this instant 82 arrives at the first timer 36 too late to prevent the timer 36 from turning on the second timer 42. However, delivery of pulse 76a to the AND circuit 46 turns on the AND circuit and causes it to produce an output signal 78a which trips the breaker. When the AND circuit 46 received the above-described pulse 76a, input signal 75a and 72 were present on its other two input channels; and, thus, arrival of pulse 76a caused turn-on of the AND circuit 46.

Reviewing what happened on this asymmetrical fault current, it will be apparent that no attempt was made to interrupt on the first current zero 80 immediately following the minor current loop (inasmuch as no tripping signal was delivered to the circuit breaker prior to instant 80). Attempted interruption was postponed until the major current loop, and actual interruption was accomplished on the first current zero 83 immediately following this loop. Since only about 2.8 milliseconds were available on the minor current loop between peak current and current zero, there was a distinct possibility that the interrupter could not have sufficiently separated its contacts by the time of current zero 80, and arcing initiated during the minor loop would have continued through the complete major loop which followed. Hence no effort was made to interrupt during the minor loop. On the major current loop, however, a much longer period, about 5.6 milliseconds, was available, and this was ample to allow full contact separation and interruption at the first current zero 83 following contact part.

The minimum duration of a current loop on which tripping will be attempted is made to depend upon the predetermined length of time required for the circuit breaker to separate its contacts by an "effective interrupting distance" following a trip signal. If the circuit breaker can consistently separate its contacts to this extent in less than the time that will elapse between peak current and the immediately following current zero on a particular current loop, then the control 30 will develop a tripping signal on that particular loop. Otherwise, no tripping signal will be developed on that particular loop, and the tripping signal will be delayed until the next current loop, which will be of sufficient duration. For example, assuming the circuit breaker can consistently separate its contacts to this extent in 3.2 milliseconds, then tripping can safely be initiated on any loop of fault current where at least 3.2 milliseconds will elapse between peak current and the immediately following current zero. It can be shown that at least this much time will be available on any reasonably expectable current loop that has a time span of at least 120 percent of this time (or 3.9 milliseconds) between the immediately preceding current zero and the instant of peak current. Accordingly, I set the control for such a circuit breaker so that tripping is initiated on any current loop where at least 3.9 milliseconds is available between the immediately preceding current zero and peak current. This means that tripping of such a circuit breaker will occur on any current loop having a duration of 3.9 + 3.2, or 7.1 milliseconds or greater following a zero crossing. The minimum time span from zero crossing to peak current required to activate the control 30 can be adjusted by adjusting the turn-on time of the second timer 42. Typically, this minimum time span will be between 3.5 and 4.1 milliseconds.

The components 32, 34, 36, 42, 60, and 62 may be thought of as measuring means for measuring the length of time between the zero current crossing and peak current since these components cooperate to decide whether this time is less than or more than the prescribed value. If less than the prescribed value, the timer 42 develops no output; if more, timer 42 develops an output.

It will be noted that the control 30 of FIG. 1 develops a tripping signal at substantially the instant of peak current. Before the circuit breaker can separate its contacts in response to this tripping signal, a 1 slight additional time has elapsed. Thus, actual contact part does not occur until after peak current, and no arcing occurs during peak current.

Figure 4:
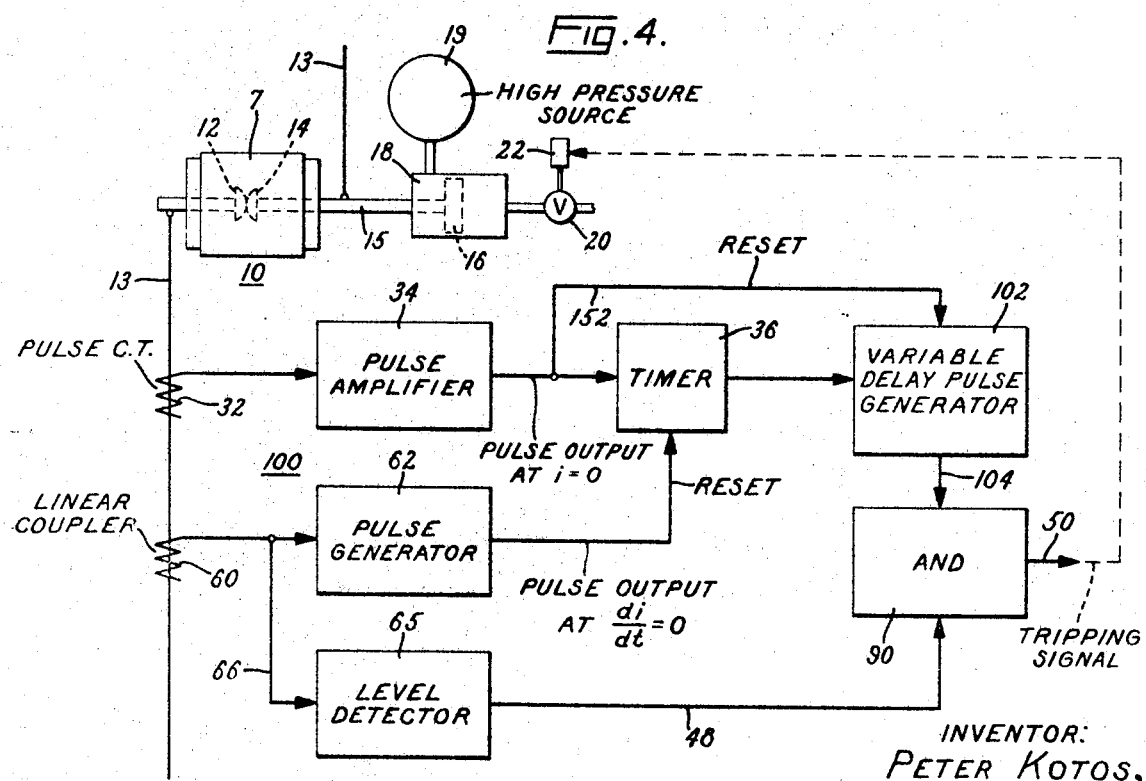
FIG. 4 is a schematic representation of a modified form of the invention.
Figure 5:
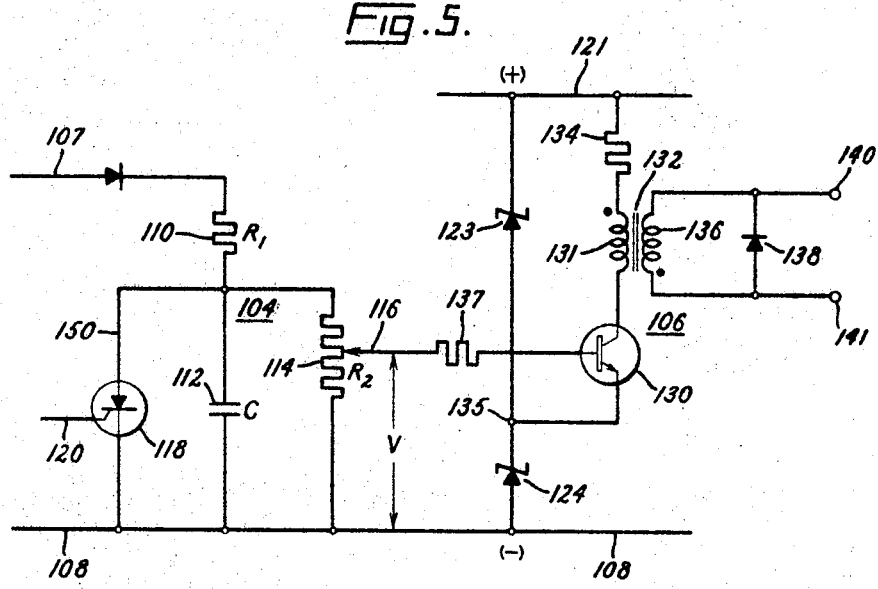
FIG. 5 is a circuit diagram of one of the portions of FIG. 4.
Figure 6:
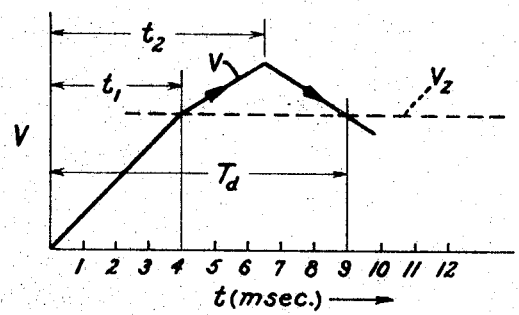
FIG. 6 is a graphic representation of the manner in which the circuit of FIG. 5 operates.

MODIFIED TRIPPING CONTROL OF FIGS. Control of FIGS. 4—6

FIG. 4 shows a modified form of the invention where a control 100 is provided for supplying a tripping signal to the circuit breaker's tripping solenoid 22 at a substantially fixed time prior to the arrival of current zero following a major current loop. This results in substantially equal arcing time for both symmetrical and asymmetrical fault currents. In the embodiment of FIGS. 1—3, since the tripping signal is supplied at peak current on both symmetrical and asymmetrical currents, a longer arcing period will occur for asymmetrical currents than symmetrical currents (assuming that tripping on asymmetrical currents takes place on a major current loop). Moreover, such arcing will occur at higher current values in the case of asymmetrical currents. The control of FIG. 4 reduces the severity of the arcing on asymmetrical currents by delaying the tripping signal beyond the instant of peak current and until a predetermined time in advance of the next-following current zero. Since it has been assumed that the circuit breaker can attain its full contact separation in approximately 3.2 milliseconds, this fixed time can be made only slightly greater than 3.2 milliseconds. To provide a margin of safety, I make this fixed time 4.0 milliseconds in one embodiment of the invention.

The control 100 of FIG. 4 comprises a pulse current transformer 32, a pulse amplifier 34, a linear coupler 60, a pulse generator 62, and a level detector 65 substantially identical to correspondingly designated parts in FIG. 1. Timer 36 is the same as the timer 36 of FIG. 1 except that its output can last for a longer time, e.g., 12 milliseconds, following its turn-on by a pulse from the pulse amplifier.

One respect in which the trip control of FIG. 4 differs from that of FIG. 1 is in having a variable delay pulse generator 102 in place of the timer 42. This pulse generator 102 produces an output pulse that appears at 104 a certain time $T_d$ after the line current passes through zero. This time delay $T_d$ depends upon the degree of offset in the current wave, and it is made to vary approximately as shown below:

$$T_d \simeq (2T_{peak} - T_{cb}) \text{ milliseconds}$$

where $T_{peak}$ is the time in milliseconds from the instant the current crosses zero following a fault until the current reaches its peak value, and $T_{cb}$ is a preselected constant time equal to or slightly greater than the circuit breaker operating time. Assuming $T_{cb}$ is 4, this equation is valid for values of $T_{peak} = 4$ to 8 milliseconds only. If $T_{peak}$ is less than 4 milliseconds (indicating a minor current loop on which no tripping is desired), the variable delay pulse generator 102 produces no output.

The output from the variable delay pulse generator 102 is fed through channel 104 to a conventional AND circuit 90 having two input channels 48 and 104. The simultaneous presence of input signals on both input channels 48 and 104 will cause the AND circuit to produce an output signal at 50 which is used to trip the circuit breaker. Recall that the level detector 65 responds to a fault developing on powerline 13 to produce a continuous output on channel 48. So if a fault develops on the line 13, the AND circuit 90 immediately begins receiving a continuous input signal via channel 48 and, thus, can immediately be activated by an input signal from the variable delay impulse generator via channel 104.

The variable delay pulse generator 102 will now be described in more detail. Referring to FIG. 5, the variable delay pulse generator 102 comprises two major components, an integrator 104 and a pulse generator 106. The integrator comprises a pair of spaced input terminals 107 and 108 across which the output voltage from timer 36 appears. Connected across these terminals 107 and 108 is the series combination of a resistor 110 and a capacitor 112. Capacitor 112 is shunted by a potentiometer resistor 114 having a tap 116 and also by an SCR 118 having a control gate 120.

The pulse generating component 106 comprises a pair of spaced-apart input terminals 116 and 108 which are adapted to receive input signals (soon to be described) from the integrator and also a pair of spaced-apart output terminals 140 and 141 which constitute the output channel 104 of FIG. 4. The pulse generating component 106 further comprises a positive bus 121 and negative bus 108 between which a suitable supply voltage is applied. Connected between these buses is a pair of Zener diodes 123 and 124 connected in series. A constant reference voltage appears across the Zener diode 124 due to the well-known voltage regulating properties of the Zener diode.

The pulse generator 106 further comprises a normally inactive NPN transistor 130 having its collector connected to the positive bus 121 through the primary winding 131 of a transformer 132 and a current limiting resistor 134. The emitter of the transistor 130 is connected to a junction point 135 between the two Zener diodes 123 and 124. The base of the transistor is connected through a current limiting resistor 137 to the tap 116 of the potentiometer 114. Resistor 137 has a much higher value than resistor 114. The constant reference voltage appearing across Zener diode 124 is used to normally reversely bias the base-emitter junction of the transistor 130, thus normally maintaining the transistor in an inactive or "off" condition. When the voltage appearing between the potential tap 116 and the negative bus 108 exceeds a predetermined threshold value, which is slightly above the fixed reference voltage appearing across Zener diode 124, the base-emitter junction of the transistor becomes forwardly biased, thus abruptly turning on transistor 130. This allows a pulse current to flow through the transistor 130 via positive bus 121, resistor 134, the primary transformer winding 131, the collector-emitter circuit of transistor 130, Zener diode 124, and negative bus 108. In passing through primary winding 131, this current pulse induces a negative voltage pulse across the secondary winding 136 of the transformer, causing a negative pulse current to flow through a clamping diode 138 connected across the secondary winding 136. When the transistor 130 is later turned off, as will soon be described, a positive voltage pulse is induced across secondary winding 136, causing a positive current pulse to appear at output terminals 140, 141.

The overall operation of the variable delay pulse generator 102 is as follows. When timer 36 turns on in response to a zero crossing of the line current, it develops an output which is fed to pulse generator 102 and appears as an input voltage between terminals 107 and 108. This input voltage is used for charging capacitor 112 through resistor 110. After a predetermined time $t_1$ (see FIG. 6) determined by the time constant of the RC circuit 110, 112, 114, the voltage across capacitor 112 is high enough to cause the voltage between potential tap 116 and bus 108 to exceed the voltage across Zener diode 124. This causes current to begin flowing through the base of transistor 130, thereby turning on the transistor and producing a positive current pulse through the primary winding 131 of the transformer 132. This produces a negative current pulse through the secondary winding 136 which passes through the diode 138 and is not used. When the current in powerline 13 reaches its peak value, the other pulse generator 62 produces an output pulse which is fed to timer 36 to terminate its output. This removes voltage from between input terminals 107 and 108 of the integrator 104, causing capacitor 112 to begin discharging through resistor 114 at a time $t_2$ in FIG. 6. When (at a time $T_d$ the voltage V between tap 116 on potentiometer 114 and bus 108 falls to a level below the reference voltage $V_z$ appearing across Zener diode 124, transistor 130 abruptly reverts to its "off" condition. This abruptly terminates the flow of current through the primary winding 131 of transformer 132, thus causing a positive voltage pulse to be developed between output terminals 140 and 141. This results in a positive current pulse being supplied to the AND circuit 19, thus turning on the AND circuit and causing it to produce a tripping signal at 50.

For resetting the capacitor 112 to a zero charge condition each time the line current passes through zero, a pulse from the pulse amplifier 34 is used for turning on the normally off SCR 118 shunting the capacitor 112. This reset pulse is supplied via channel 152 of FIG. 4 to the gate lead 120 of the SCR. This turn-on of SCR 118 establishes a low resistance discharge path 150 through which capacitor 112 quickly discharges. The SCR immediately returns to its "off" state following capacitor discharge.

The time delay $T_d$ elapsing between the zero current crossing and the instant an output pulse appears at 104 is determined by the value selected for resistors 110, 114 and 137 and capacitor 112. Referring to FIGS. 5 and 6, by suitably selecting these values and also the tap setting on potentiometer 114, the time $t_1$ required for voltage V to reach the voltage $V_z$ can be made equal to the desired 4.0 milliseconds. This time $t_1$ depends upon the average rate at which capacitor 112 is charged from the voltage across 107, 108, and this average rate is determined by the charging time constant, which is substantially equal to $\frac{C(R_1 R_2)}{R_1 + R_2}$ seconds, where C is the capacitance of capacitor 112 in microfarads, $R_1$ is the resistance of resistor 110 in megohms, and $R_2$ is the resistance of resistor 114 in megohms. When the voltage V slightly exceeds $V_z$, the transistor 130 turns on, and the previously described negative pulse, which is unused, flows through the secondary winding 136. But the charge on the capacitor 112 continues to buildup until the timer 36 is turned off at peak current. At this point ($t_2$ in FIG. 6), the capacitor begins discharging at an average rate determined by the discharging time constant, which is substantially equal to $R_2 C$ seconds, where $R_2$ is the resistance of resistor 114 in megohms and C is the capacitance of capacitor 112 in microfarads. By suitably selecting the values of $R_1$, $R_2$, and C, the average charging rate between $t_1$ and $t_2$ can be made substantially equal to the average discharging rate between $t_2$ and $T_d$ so that substantially the same time $(t_2 - t_1)$ will be required to increase the voltage V from $V_z$ to its peak value at $t_2$ as is required to return the voltage V from its peak value to $V_z$. The result is that the voltage V returns to $V_z$ substantially the same period ahead of the next-following current zero as the length of period $t_1$, which is the desired 4 milliseconds.

The resistance of resistor 137 is so high relative to that of the other resistors 110 and 114 as to have a negligible effect on the above-mentioned time constants.

It should be apparent that if the voltage V does not reach a value $V_z$ on a given current loop, then transistor 130 will not turn on during that particular loop; and there will be no output from the variable delay pulse generator 102 to turn on the AND circuit 90. At the next-following current zero, the SCR 118 will be turned on to immediately discharge the capacitor 112 and prepare it for another timing operation should there be an input signal from timer 36.

GENERAL DISCUSSION

It will be apparent from the above description that neither of these two controls 30 and 100 depends for its accuracy upon a current transformer providing an output current reproducing the waveform of the current in line 13. The pulse current transformer 32 responds only to the passage of line current through zero, and its output is a series of pulses, each coinciding with passage through current zero. While the linear coupler 60 must produce a voltage output that is accurately related to the waveform of line current, it has no difficulty doing this since it is a nonsaturable device which is not susceptible to distortion of its output waveform through saturation at high fault currents. Had a substantial current with a waveform identical to that of line current been required as an input signal by the control 30 or 100, then it would not have been feasible to rely upon a linear coupler since its current output is extremely small.

Figure 7:
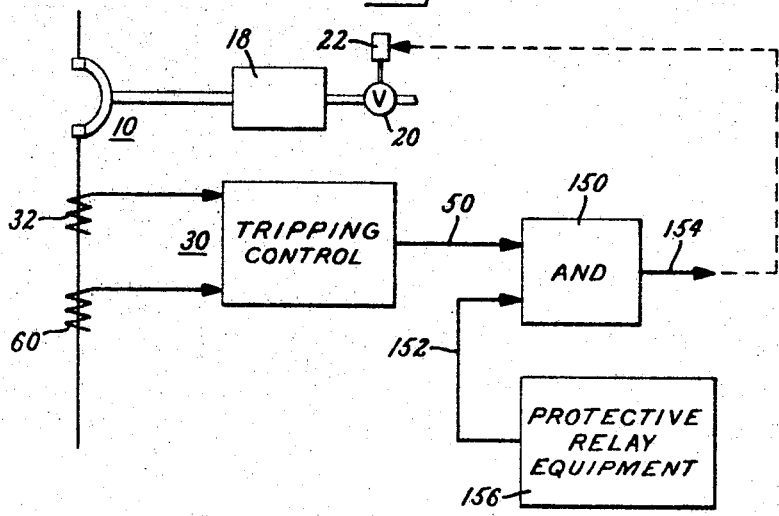
FIG. 7 is a schematic representation of another modified form of the invention.

Although I have shown the control 30 being used in FIG. 1 as the sole control for controlling tripping of the circuit breaker 10, it is to be understood that this control can be used in conjunction with protective relays or the like to control tripping on a coordinated basis. This can be done, for example, by using an arrangement such as schematically shown in FIG. 7. In this arrangement the output from control 30, instead of being fed directly to the trip coil of the circuit breaker as in FIG. 1, is fed to an AND circuit 150 which has an output channel 154 for supplying a tripping signal to the trip coil of the circuit breaker. This AND circuit 150 has two input channels 50 and 152 and requires the simultaneous presence of input signals on both input channels in order to produce an output signal on output channel 154. The input channel 152 is from a conventional protective relay 156 which supplies a continuous signal to channel 152 once relay 156 determines that circuit conditions are such as to require the circuit breaker 10 to operate. It will be assumed that unless this continuous signal is present on channel 152, then the control 30 should not cause the circuit breaker 10 to operate, thereby affording some other circuit breaker (not shown) the opportunity of clearing the fault producing the fault current through powerline 13. Until protective relay 156 makes a decision that circuit breaker 10 is to be relied upon for clearing the fault, control 30 continues to supply tripping signals, such as 78 or 78a (FIG. 2), to the second AND circuit 150 each time the fault current passes through its peak value. But no tripping signal is delivered to the tripping solenoid 22 until the protective relay 156 causes a continuous output to appear at 152. Thereafter, the signal 78 or 78a applied via input channel 50 causes an output signal, or tripping signal, to appear at 154 and be delivered to tripping solenoid 22, thus tripping circuit breaker 10. In connection with FIG. 2, it can be assumed that a continuous output from the protective relay is not present when the first tripping signal 78 is developed but is present when the second tripping signal 78a is developed. Accordingly, the tripping solenoid will not receive a tripping signal at the first current peak but will receive a tripping signal at the next current peak, when tripping signal 78a is developed, thus tripping the breaker immediately thereafter so as to interrupt the circuit at the next current zero 83.

The second AND circuit 150 may be thought of as blocking means which prevents the control 30, 150 from delivering a tripping signal to the circuit breaker so long as no starting signal is received from the protective relay equipment 156. When a starting signal is received, the control 30, 150 is free to supply a tripping signal to the circuit breaker at the above-described instant on the current wave.

It is to be understood that the tripping control 100 of FIG. 4 can be used in the arrangement of FIG. 7 in place of tripping control 30 to provide for tripping at a fixed time ahead of current zero when the AND circuit 150 of FIG. 7 is unblocked by a starting signal from the protective relay 156.

Although my invention is especially applicable to circuit breakers capable of consistently interrupting at the first current zero following contact part, it is to be understood that the invention, in its broader aspects, is also applicable to circuit breakers which might sometimes need to wait until the next current zero before completing interruption. In such applications, by precluding the tripping signal from being delivered on a highly offset minor current loop, I assure that the second current loop, if any, is not a highly offset major loop, which might release objectionably large amounts of arcing energy since arcing would take place during the entire duration of any second loop.

While I have shown and described particular embodiments of my invention, it will be obvious to those skilled in the art that various changes and modifications may be made without departing from my invention in its broader aspects; and I, therefore, intend in the appended claims to cover all such changes and modifications as fall within the true spirit and scope of my invention.

I claim:

1. A control for an alternating current circuit breaker which is capable of separating its contacts by an effective interrupting distance within a predetermined operating time of less than 4 milliseconds following reception of a tripping signal from said control, said control comprising:
   a. means for disabling said control when normal currents are flowing through said circuit breaker and responsive to the inception of a fault for rendering said control capable of supplying a tripping signal to said circuit breaker during the flow of fault current therethrough;
   b. measuring means for measuring during each full loop of fault current that begins with a zero current crossing the time period from said zero crossing to the instant of peak current;
   c. means responsive to the length of said time period for delivering a tripping signal to said circuit breaker at a point between substantially said instant of peak current and the immediately following current zero if said time period exceeds a preselected value at least as great as said predetermined operating time; and
   d. blocking means for preventing said control from delivering said tripping signal to said circuit breaker prior to said immediately following current zero if said time period is less than said preselected value.

2. The control of claim 1 in which said tripping signal is delivered to said circuit breaker sufficiently before said immediately following current zero to provide sufficient time for said circuit breaker to separate its contacts by an effective interrupting distance by the time said immediately following current zero arrives.

3. A control as defined in claim 1 and further comprising: additional blocking means for preventing supply of said tripping signal to said circuit breaker so long as no starting signal has been received from protective relaying equipment coordinated with said control, said blocking means being unblocked to allow said control to supply said tripping signal to said circuit breaker upon receipt of said starting signal from said relaying equipment.

4. The control of claim 1 in which said tripping signal is delivered to said circuit breaker on a given current loop if said time period from zero crossing to peak current on said loop exceeds a preselected value of between 3.5 and 4.1 milliseconds.

5. The control of claim 1 in which said tripping signal is delivered to said circuit breaker at substantially peak current on any current loop selected by said control for tripping.

6. The control of claim 1 in which said control delivers said tripping signal to said circuit breaker at an instant which is a substantially fixed period of time in advance of current zero on any current loop selected by the control for tripping.

7. The control of claim 1 in which said measuring means and said means of paragraph (c), claim 1 comprise:
   a. means for developing a pulse on each of said full loops of fault current when the fault current crosses zero at the beginning of the loop;
   b. means for developing another pulse on each of said full loops of fault current when the fault current reaches substantially its peak value; and
   c. means responsive to the time period elapsing between said pulses for developing an output signal if said time period exceeds said preselected value.

8. The control of claim 7 in combination with means for delaying development of said output signal by a time period, measured from said zero crossing, of substantially: $2T_{pea} - T_{cb}$ where $T_{peak}$ is the time elapsing between said pulses and $T_{cb}$ is a time period equal to or slightly greater than said predetermined operating time.

9. A control as defined in claim 1 and further comprising: additional blocking means for preventing supply of said tripping signal to said circuit breaker so long as no starting signal has been received from protective relaying equipment coordinated with said control, said blocking means being unblocked to allow said control to supply said tripping signal to said circuit breaker upon receipt of said starting signal from said relaying equipment.

10. A control for an alternating current circuit breaker which is capable of separating its contacts by an effective interrupting distance within a predetermined operating time of less than 4 milliseconds following reception of a tripping signal from said control, said control comprising:
    a. means for disabling said control when normal currents are flowing through said circuit breaker and responsive to the inception of a fault for rendering said control capable of supplying a tripping signal to said circuit breaker during the flow of fault current therethrough;
    b. means responsive to the fault current crossing zero at the start of each full loop of fault current for developing a continuous output signal of substantially constant amplitude immediately following said zero crossing;
    c. integrating means receiving said continuous output signal and developing an increasing timing voltage that varies in magnitude directly in accordance with the duration of the period over which said continuous output signal is received;
    d. means for terminating reception of said continuous output signal by said integrating means at substantially the instant that said fault current reaches its peak value, thus causing said timing voltage to reach a crest, and for thereafter causing said timing voltage to decay from said crest;
    e. means responsive to decay of said timing voltage to a predetermined reference voltage level to develop a tripping signal for said circuit breaker;
    f. means for causing decay of said timing voltage to occur at such a rate that substantially the same time is required for the timing voltage to decay to said reference voltage level from its crest as was required for the timing voltage to rise to said crest from said reference voltage level during reception of said continuous output signal; and
    g. said reference voltage level being selected so that on increasing timing voltage said reference voltage level is reached at a time following said zero crossing which is substantially equal to or slightly greater than said circuit breaker-operating time.

11. The control of claim 10 in which decay of said timing voltage is caused to occur at substantially the same average rate as said timing voltage increased after reaching said reference voltage level during reception of said output signal.

12. The control of claim 10 in which:
    a. said means responsive to fault current crossing zero comprises a pulse transformer connected for energization by said fault current for developing an output pulse at substantially the instant of said zero crossing and means energized by said output pulse for developing said continuous output signal; and
    b. said means for terminating reception of said continuous output signal comprises: a substantially nonsaturable coupling device energized by said fault current through said breaker for developing an output voltage proportional to the rate of change of said current and means energized by said output voltage for developing a reception-terminating reset signal when said output voltage passes through zero.

13. A control for an alternating current circuit breaker which is capable of separating its contacts by an effective interrupting distance within a predetermined operating time of less than 4 milliseconds following reception of a tripping signal from said control, said control comprising:
    a. means for disabling said control when normal currents are flowing through said circuit breaker and responsive to the inception of a fault for rendering said control capable of supplying a tripping signal to said circuit breaker during the flow of fault current therethrough;
    b. means for sensing whether full loops of fault current following fault inception are major, minor, or nonoffset loops;

c. means for delivering a tripping signal to said circuit breaker during a sensed current loop at a point ahead of the immediately following current zero if said sensed loop is a major or a nonoffset loop; and d. means for precluding delivery of said tripping signal to said circuit breaker until the next current loop if said sensed loop is a minor loop having a duration from peak current to current zero shorter than said predetermined operating time.

14. A control for tripping a circuit breaker at a predetermined point on the current wave of fault current flowing through an alternating current powerline following fault inception, comprising:

a. a pulse transformer connected in said line and responsive to said fault current crossing zero for developing a first output pulse each time said fault current crosses zero at the beginning of a current loop;

b. means for developing a second output pulse each time the fault current in said line reaches a peak value during a loop of fault current following a zero crossing comprising:
  i. a substantially nonsaturable coupling device energized by said fault current for developing an output voltage proportional to the rate of change of said fault current, and
  ii. pulse-generating means energized by said output voltage for developing said second pulse when said output voltage passes through zero, c. and means for developing a tripping signal for said circuit breaker during a given loop of fault current if more than a predetermined period of time elapses between said first pulse and said second pulse during said given loop of fault current.

15. A control as defined in claim 14 and further comprising means for preventing said tripping signal from being developed if less than said predetermined time elapses on a given loop of fault current between said first and second pulses.

16. A control for an alternating current circuit breaker which rapidly separates its contacts following reception of a tripping signal from said control, said control comprising:

a. means for disabling said control when normal currents are flowing through said circuit breaker and responsive to the inception of a fault for rendering said control capable of supplying a tripping signal to said circuit breaker during the flow of fault current therethrough;

b. measuring means for measuring during each full loop of fault current that begins with a zero current crossing the time period from said zero crossing to the instant of peak current;

c. means responsive to the length of said time period for delivering a tripping signal to said circuit breaker at a point between substantially the instant of peak current and the immediately following current zero if said time period exceeds a preselected value; and d. blocking means for preventing said control from delivering said tripping signal to said circuit breaker prior to said immediately following current zero if said time period is less than said preselected value.

17. The control of claim 16 in which said tripping signal is delivered to said circuit breaker on a given current loop if said time period from zero crossing to peak current on said loop exceeds a preselected value of between 3.5 and 4.1 milliseconds.

18. The control of claim 16 in which said tripping signal is delivered to said circuit breaker at substantially peak current on any current loop selected by said control for tripping.

19. The control of claim 16 in which said control delivers said tripping signal to said circuit breaker at an instant which is a substantially fixed period of time in advance of current zero on any current loop selected by the control for tripping.